(12) United States Patent
Ylitalo et al.

(10) Patent No.: US 6,580,701 B1
(45) Date of Patent: Jun. 17, 2003

(54) INTERPRETATION OF A RECEIVED SIGNAL

(75) Inventors: Juha T. Ylitalo, Oulu (FI); Zhengdi Qin, Tampere (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/474,606

(22) Filed: Dec. 29, 1999

Related U.S. Application Data

(63) Continuation of application No. PCT/FI98/00569, filed on Jul. 3, 1998.

Foreign Application Priority Data

Jul. 4, 1997 (FI) .................................................. 972870

(51) Int. Cl.$^7$ ............................. H04L 12/26; H04J 3/14; G08C 15/00; G06F 11/00
(52) U.S. Cl. ....................... 370/334; 370/252; 370/347; 375/267; 375/347; 455/132
(58) Field of Search ................................. 370/334, 335, 370/342, 441, 479, 310, 329; 375/267, 299, 346, 347, 348; 455/132, 133, 135, 137

(56) References Cited

U.S. PATENT DOCUMENTS

| | | | | | |
|---|---|---|---|---|---|
| 4,639,914 | A | * | 1/1987 | Winters | 370/334 |
| 5,481,570 | A | * | 1/1996 | Winters | 375/347 |
| 5,680,419 | A | * | 10/1997 | Bottomley | 375/347 |
| 6,081,566 | A | * | 6/2000 | Molnar et al. | 375/347 |
| 6,088,408 | A | * | 7/2000 | Calderbank et al. | 375/347 |
| 6,108,565 | A | * | 8/2000 | Scherzer | 455/562 |
| 6,147,985 | A | * | 11/2000 | Bar-David et al. | 370/347 |
| 6,173,014 | B1 | * | 1/2001 | Forssen et al. | 375/267 |
| 6,292,135 | B1 | * | 9/2001 | Takatori et al. | 342/383 |
| 6,134,147 | A1 | * | 11/2001 | Liang et al. | 375/346 |

FOREIGN PATENT DOCUMENTS

| | | |
|---|---|---|
| EP | 0 18 357 | 9/1984 |
| EP | 0 786 914 | 7/1997 |
| WO | 95/22873 | 8/1995 |
| WO | 95/34997 | 12/1995 |
| WO | 97/08849 | 3/1997 |

OTHER PUBLICATIONS

"MMSE Space–Time Equalization for GSM Cellular Systems" Ratnavel, et al. Proceedings of the IEEE Vehicular Technology Conference, Atlanta, 1996.
International Search Report for PCT/FI98/00569.

* cited by examiner

*Primary Examiner*—Wellington Chin
*Assistant Examiner*—M. Phan
(74) *Attorney, Agent, or Firm*—Squire, Sanders & Dempsey L.L.P.

(57) ABSTRACT

The invention relates to interpretation of a transmitted signal from signals obtained at the signal reception end from an antenna vector including several antenna elements. The inventive idea is to interpret the signal in two steps. In the first step, directed signal beams are formed of the multidimensional signal obtained from the antenna vector. In the second step, the directed signals are input to an optimum merger which deduces the transmitted signal from several signal branches used as input.

15 Claims, 7 Drawing Sheets

| 3 | 58 | 26 | 58 | 3 | 8, 25 |
|---|---|---|---|---|---|
| TAIL | 1st HALF BURST | TRAINING PERIOD | 2nd HALF BURST | TAIL | GUARD TIME |

INTERPRETATION OF A RECEIVED SIGNAL

This is a continuation of application No. PCT/FI98/00569, filed Jul. 3, 1998.

This invention relates to processing of the signal of a radio receiver using one or several antennas including several antenna elements.

BACKGROUND OF THE INVENTION

FIG. 1 shows transmission of a signal from a sender to a receiver in a telecommunication system. The information to be transmitted is conveyed over a transmission channel, such as a radio channel, modulated into a form suitable for the channel. Known methods of modulation include amplitude modulation, where the information is contained in the signal amplitude, frequency modulation, where the information is included in the signal frequency, and phase modulation, where the information is included in the signal phase. Non-ideal features of the transmission channel, such as signal reflections, noise and interference caused by other connections, cause changes in the signal containing the information, which is why the signal perceived by the receiver is never an exact copy of the signal sent by the sender. Information to be sent in digital systems can be made to better withstand non-ideal features of the transmission path with the aid of channel coding. At the receiving end the receiver will correct the received signal with a channel corrector based on channel characteristics which it knows and it will undo the modulation used on the transmission channel as well as the channel coding.

Besides attenuation of the amplitude, a sent signal will broaden on the transmission channel both at frequency level and time level. The information included in the signal by some modulation method will hereby also change. Broadening of the signal is caused especially in radio systems mainly by multipath propagation, which is shown in FIG. 2. In the figure a signal is examined which travels from the base transceiver station BTS to a mobile station MS in a mobile station system. The signal travels from the base transceiver station along a straight route, the length of which is $L_{straight}$. In addition, the mobile station perceives two beams, which are reflected from an obstacle and the route lengths of which are $L_{refl1}$ and $L_{refl2}$ respectively. The mobile station receives the signal conveyed by the reflected beam 1 after a delay $\Delta T_1 = (L_{refl1} - L_{straight})/c$ and the signal conveyed by beam 2 after a delay $\Delta T_2 = (L_{refl2} - L_{straight})/c$ later than the signal which propagated straight (c=speed of light). Thus, the receiver perceives the sent signal as three signals arriving at slightly different times and from different directions and summing up as one, which causes overlapping of symbols sent in succession, that is, Inter-Symbol Interference ISI.

Besides multipath propagation, inter-symbol interference is caused by the modulation methods used. E.g. in a Gaussian Minimum Shift Keying method (GMSK) used in a GSM system, changes between successive signals are smoothed to save the frequency band of the radio channel in such a way that the effect of an individual symbol will extend over the time of three symbol periods. Since the effect is on the signal phase, it will cause a non-linear component in the inter-symbol interference. The GMSK method is described more closely e.g. in the GSM 05.04 standard published by the ETSI (ETSI=European Telecommunications Standards Institute).

In order to correct changes caused by the channel, there must be sufficiently accurate knowledge of channel characteristics at the receiving end. Known channel estimation methods are the use of a Training Period TP and blind channel estimation. In blind channel estimation, an estimate of channel characteristics is maintained by defining from the received signal the statistically most likely transmitted signal. If the signal reconstructed from the received signal with the aid of estimated channel characteristics is not probable or even possible, the estimate of channel characteristics is changed.

In channel estimation methods using a training period, the idea is to include such a training period in the transmitted signal, the contents of which are known to the receiver. By comparing the received and distorted training period, which has travelled through the channel, with the training period which it knows and which was sent to the channel, the receiver will obtain information on channel characteristics. Based on the information obtained the receiver may correct any distortions caused by the channel also from such other transmitted information conveyed in other parts of the burst which the receiver does not know beforehand.

FIG. 3 shows how a training period is located in a burst for use in digital radio communication. In the figure the training period is located in the middle part of the burst, whereby the average distance of information bits from the training period is minimised. A first half-burst containing information to be transmitted is located before the training period, and a second half-burst containing information is located after the training period. In addition, at the ends of the burst there are also tails needed for perceiving the ends of the burst and a safety time used for preventing overlapping of successive bursts.

FIG. 4 shows the occurrence of interference caused to one another by simultaneous connections. In the figure, three mobile stations MS1, MS2 and MS3 communicate with base transceiver stations BTS1, BTS2 and BTS3. The signal received by base transceiver station BTS1 contains a signal S1 sent by mobile station MS1 and shown by a solid line, the strength of which depends on the transmission power used by mobile station MS1, on fading on the radio path between mobile station MS1 and base transceiver station BTS1 and on the antenna's sensitivity in the direction of arrival of the beam. Typically, radio path fading is smaller the closer the mobile station is located to the base transceiver station. Besides signal S1, the signal received by the base transceiver station contains signal components I21 and I31 resulting from signals sent by mobile stations MS2 and MS3. The receiver perceives signals S1, I21 and I31 as a straight beam but also as several reflections coming from different directions, which are not however shown in the figure for the sake of simplicity. Components I21 and I31 will cause interference in the reception, unless they can be filtered away from the signal received from the base transceiver station. Correspondingly, the signal sent by mobile station MS1 causes in the signals received by base transceiver stations BTS2 and BTS3 signal components I12 and I13 which may cause interference in receptions. Components of a similar kind will also occur in the signals received by the mobile stations from the base transceiver stations.

If signal components I21 and I31 are on the same channel as signal S1, they can not be removed by filtering. Also signals which are on some other channels than the same channel may cause interference. Since e.g. in systems using FDM frequency division such channels which are beside each other at the frequency level are always slightly overlapping due to an optimally efficient use of the frequency spectrum, interference will also be caused in the reception by signals on the adjacent channel. Similarly, when using CDM code division, connections using codes which resemble each other too much will cause interference to each other. However, so-called adjacent channel interference caused by signals on other channels are considerably smaller than the interference caused by equally powerful signals on the same channel.

Thus the magnitude of interference caused by connections to one another depends on the channels used by the connections, on the geographical location of the connections and on the transmission power used. These may be affected by such systematic channel allocation to different cells which takes interference into account, by transmission power control and by averaging of the interference experienced by the different connections.

Besides by the methods mentioned above, connection interference can be reduced by making use of the fact that the desired signal and the interfering signal typically arrive at the receiver from different directions. The interference can hereby be reduced by directing the antenna adaptively so that its sensitivity is greatest in the direction of the desired beam and considerably smaller in the direction of arrival of interfering beams. The antenna is directed by using several antenna elements, the signal phase of which is controlled. This method is called Spatial Division Multiple Access method (SDMA). Using the SDMA method signals can be distinguished not only by their frequency and time slot channel but also by their direction of arrival. Thanks to this the same channel may be used in the method several times even inside one and the same cell.

FIG. 5 shows the basic principle of a SDMA system. The base transceiver station perceives signals $S_1$ and $S_2$ sent by two mobile subscribers MS1 and MS2 with several different antenna elements A1 ... A4. The method is based on the fact that although the signal $x_1 ... x_4$ received by each individual antenna element is a combination of two separate transmitted signals $S_1$ and $S_2$, different antennas will perceive different combinations. Under these circumstances the sum signals $x_1 ... x_4$ received by the antennas form signals $S_1$ and $S_2$ that can be distinguished from each other thanks to the different training periods used by the mobile subscribers.

FIGS. 6 and 7 show known methods of merging signals obtained from an antenna vector. In the arrangement shown in FIG. 6, signals $x_1 ... x_8$ of antennas A1 ... A8 are fed directly to an optimum merger, such as a MuliDimensional Maximum Likelihood Sequence Estimator MD-MLSE. The MD-MLSE may be implemented e.g. with a vectored Viterbi algorithm. To the merger algorithm is supplied, besides the input vectors $x_1 ... x_8$, a channel characteristic estimator H with the aid of which inter-symbol interference is reduced. In addition, the estimator may supply to the combination algorithm MD-MLSE information Q on any correlation between different signals.

It is a problem with direct optimum merging that the complexity of merging algorithms will typically increase exponentially in relation to the input signals. Hereby in bigger systems using e.g. eight antenna elements implementation of the algorithm demands very high computation power. Another problem with this method is its relatively high sensitivity to noise.

FIG. 7 shows another known method of interpreting a signal received by an antenna vector. The method is presented in the publication S. Ratnavel et al., "MMSE Space-Time Equalization for GSM Cellular Systems", Proceedings of the IEEE Vehicular Technology Conference, Atlanta, USA, 1996. The method separates from each other the linear inter-symbol interference caused by the radio channel and the non-linear inter-symbol interference caused by the GMSK modulation used in GSM. The data to be transmitted and the training period are first separated from each other from the signal x1 ... x4 of the antenna vector A1 ... A4. The characteristics of the radio channel are estimated with the MMSE method (Minimum Mean Square Error)by comparing the received training periods with the modulated training period. The MMSE method minimises the square sum of the deviation between the received training period corrected by the channel corrector and the true training period. Information obtained simultaneously from all antenna elements is used in the definition of channel characteristics. The estimation results in coefficients $W_i$ which are used in the time and place dependent channel corrector and the number of which is Mp, wherein M is the number of antennas and p is the number of potential values of delay differences of signals which are taken into account in the channel correction. In a GSM system, four bit periods, which is equal to approximately 15 microseconds, are used as the time broadening taken into account by channel correctors.

Since the correction coefficients $W_i$ used with different antenna signals are calculated using information on the radio channel between transmitter and elements which is available simultaneously from all antenna elements, the coefficients also contain phase information between the antennas. With the aid of this information the receiving beam of the antenna is directed towards the transmitter sending the desired signal.

The time and place dependent channel corrector corrects the signal obtained from antenna A1 with coefficients $w_{10} ... w_{14}$, and the signal obtained from antenna A2 with coefficients $w_{20} ... w_{24}$, etc. The channel corrected signals of the antennas are summed together, and the resulting corrected signal is supplied to the GMSK demodulator, which will undo the modulation used for the signal on the radio path.

The finite length of the used training period is a problem with this method. If the training period length is e.g. 26 bits, such as e.g. in a GSM system, and channel correction is used for correcting time broadening, the length of which is four bit periods, then 22 bits are available for use in the estimation of channel characteristics. Based on these 22 bits it is possible unambiguously to define no more than 22 parameters, so the result Mp of the number of antennas M and the signal's time broadening p taken into account by the channel correction must be less than 22. Due to the limitations caused by this over parametrisation of the estimator the number of antennas is limited even theoretically to four, which again reduces the receiver's interference and noise tolerance.

Thus, the problems with state-of-the-art systems are high complexity and a relatively high sensitivity to noise or a limitation of the number of antennas which can be used. It is an objective of the present invention to eliminate or at least to aleviate these state-of-the-art problems. This objective is achieved with the methods and equipment presented in the independent claims.

SUMMARY OF THE INVENTION

The inventive idea is to perform interpretation of the received signal in two steps. In the first step, dynamically directed signal beams are formed of a multidimensional signal obtained from an antenna vector including several antenna elements. In the second step, the directed signals are supplied to an optimum merger, which concludes the transmitted signal from several signal branches used as input.

In a first advantageous embodiment, signals obtained from antenna elements are directed by multiplying the signal vector obtained from the antenna vector by complex coefficients, which are obtained from an analysis of the direction of arrival of the signal. Since the signal's direction of arrival changes slowly compared with changes in radio path fading, information obtained over a longer time can be used in the estimation of the direction of arrival, whereby the antenna beam can be directed more accurately. For the signal beams which are obtained from the beam formation and which have experienced different radio channels, estimates of channel characteristics are defined, which are input to the optimum merger together with the beam signals. The number of directed beams is preferably smaller than the number of antenna elements, whereby the complexity of the optimum merger is essentially reduced. The optimum merger deduces the most likely transmitted signal from information obtained from different signal beams.

In another advantageous embodiment, the signals obtained from antenna elements are first divided into smaller groups. The signals of each group are input to their own MMSE estimator which corrects the channel and phases the elements. Each MMSE estimator produces one channel corrected and directed signal, which is switched to the optimum merger. The optimum merger deduces the most likely transmitted signal from signals obtained from different MMSE estimators and containing the same information.

BRIEF DESCRIPTION OF THE DRAWINGS

The invention will be described more closely with reference to the appended drawings, wherein.

DETAILED DESCRIPTION OF THE INVENTION

Figure 1:
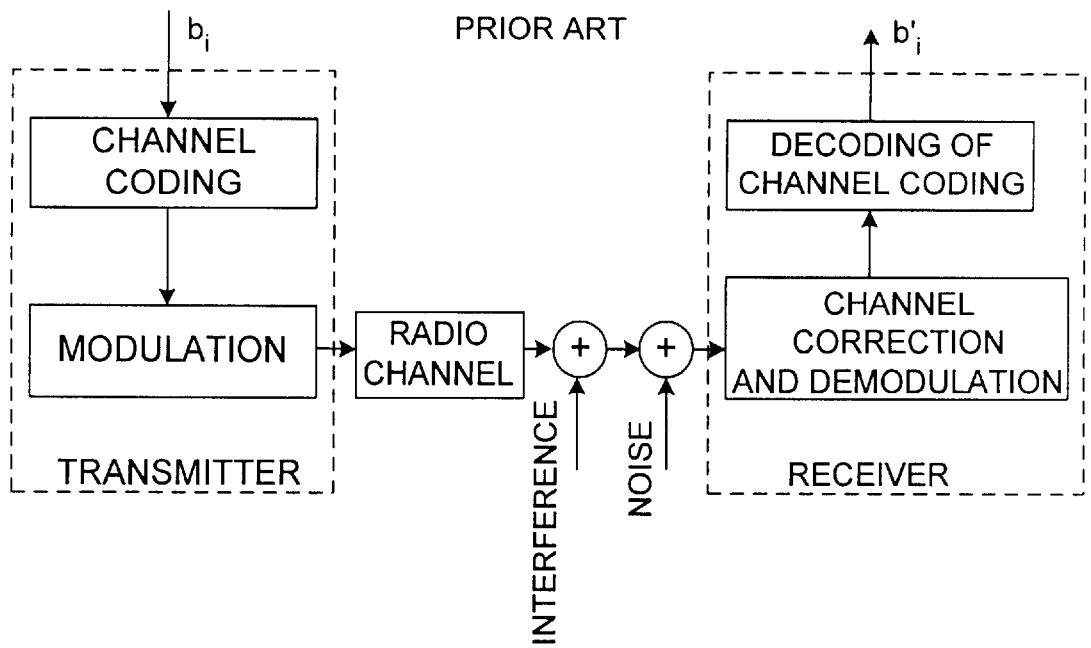
FIG. 1 shows signal transmission over a telecommunication channel.
Figure 2:
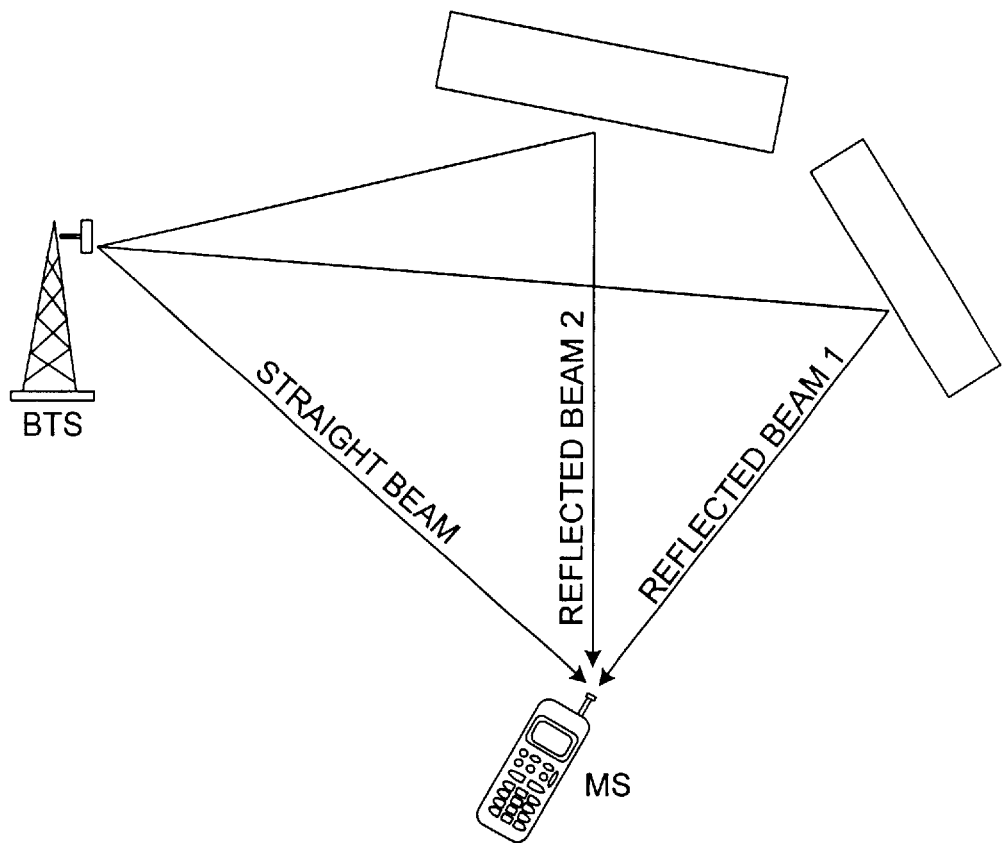
FIG. 2 shows multipath propagation of a signal over a radio channel.
Figure 3:
FIG. 3 shows the structure of a burst in a GSM system.
Figure 4:
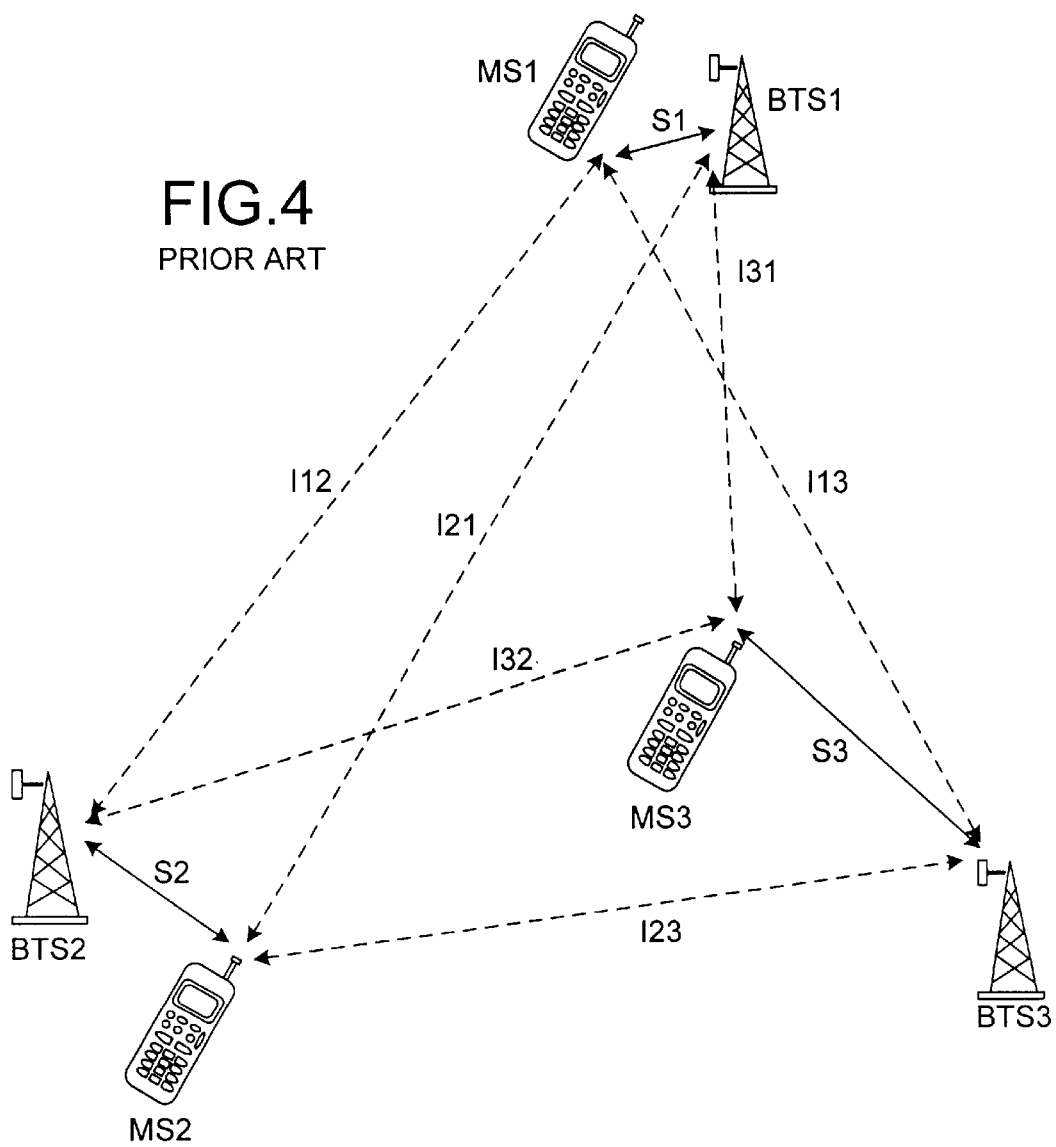
FIG. 4 shows the occurrence of interference between connections.
Figure 5:
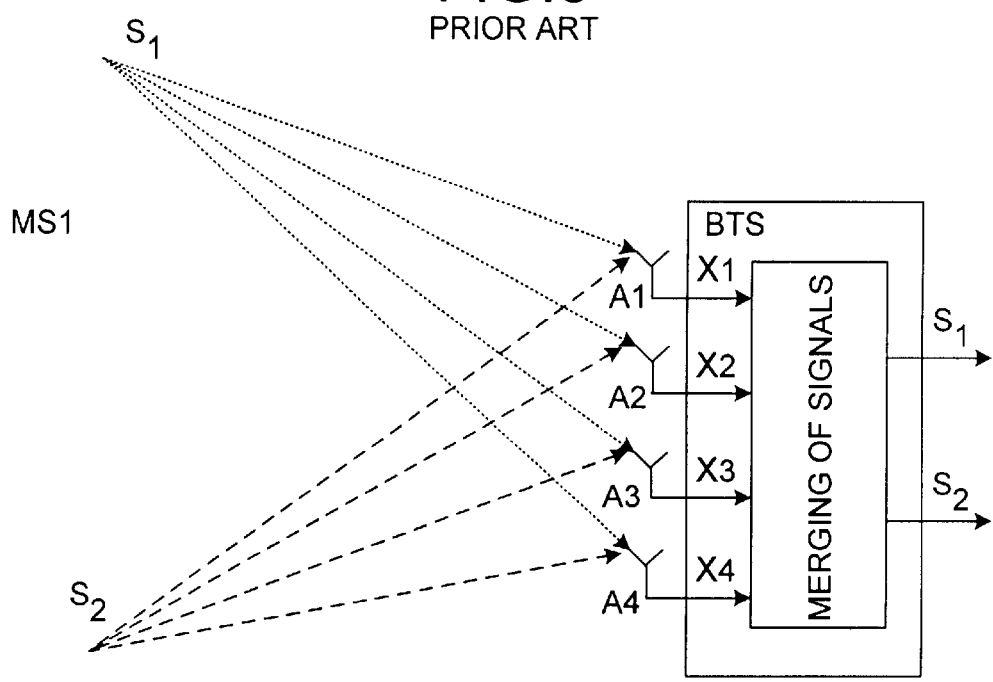
FIG. 5 shows the operation of a SDMA system using an antenna vector.
Figure 6:
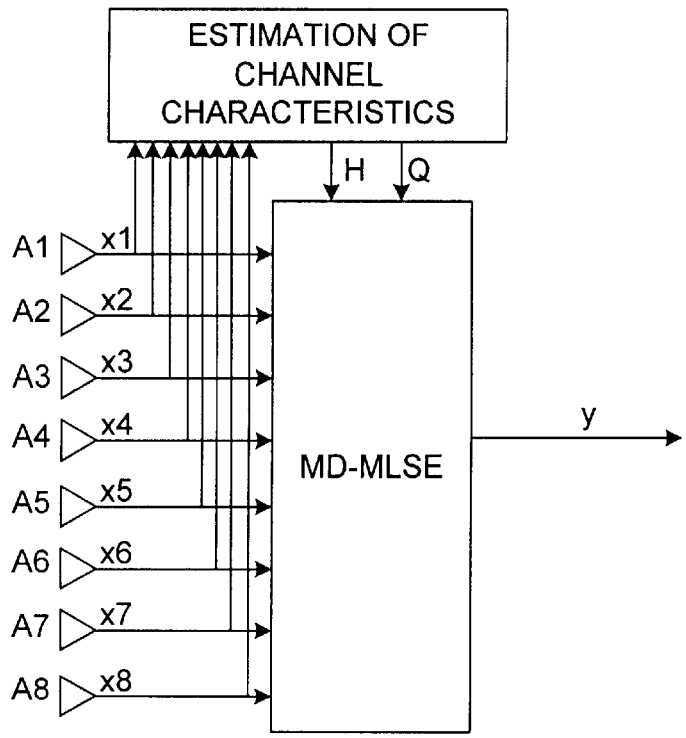
FIG. 6 shows a known method of interpretation of a signal obtained from an antenna vector.
Figure 7:
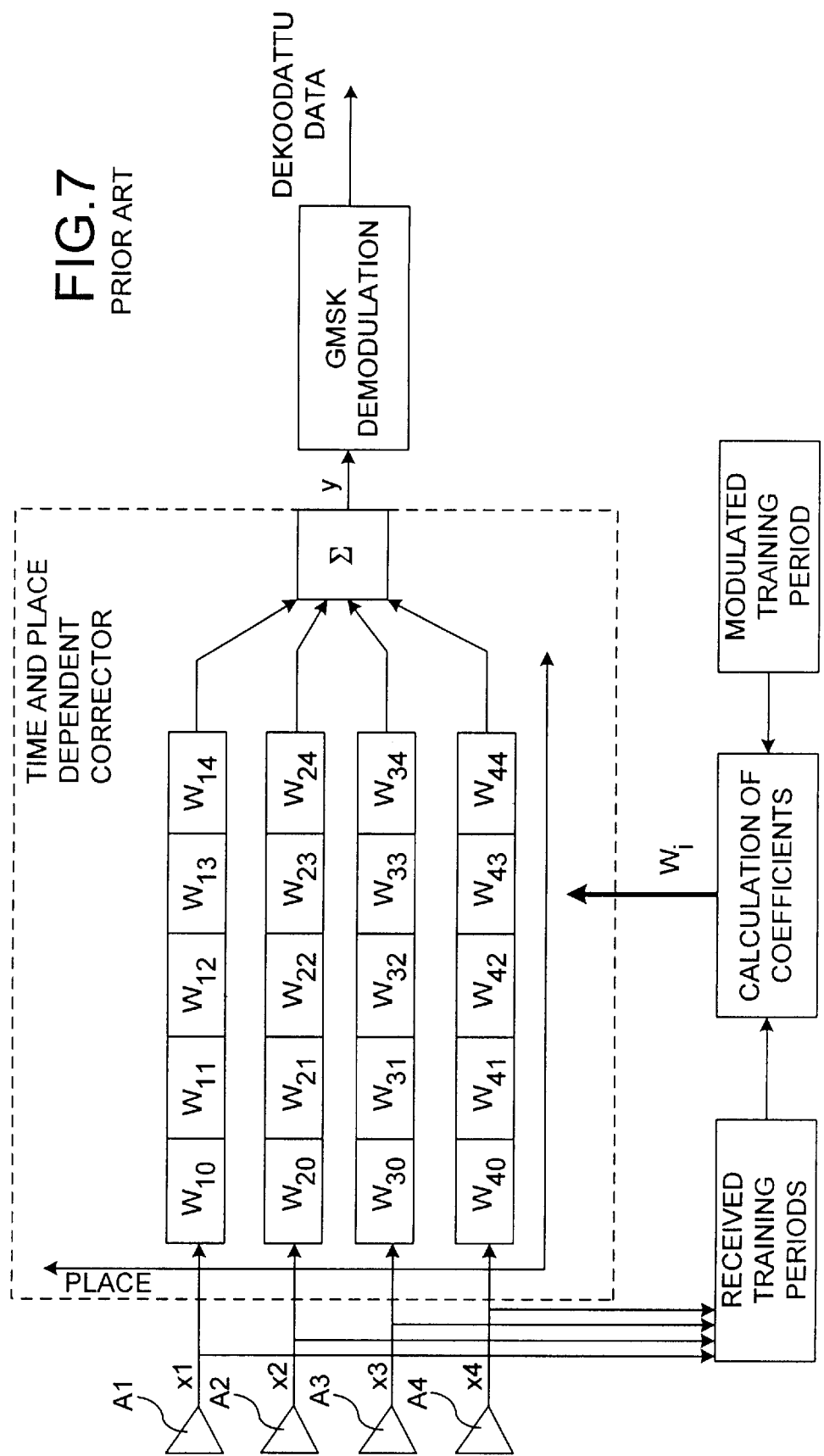
FIG. 7 shows another known method of interpretation of a signal obtained from an antenna vector.
Figure 8:
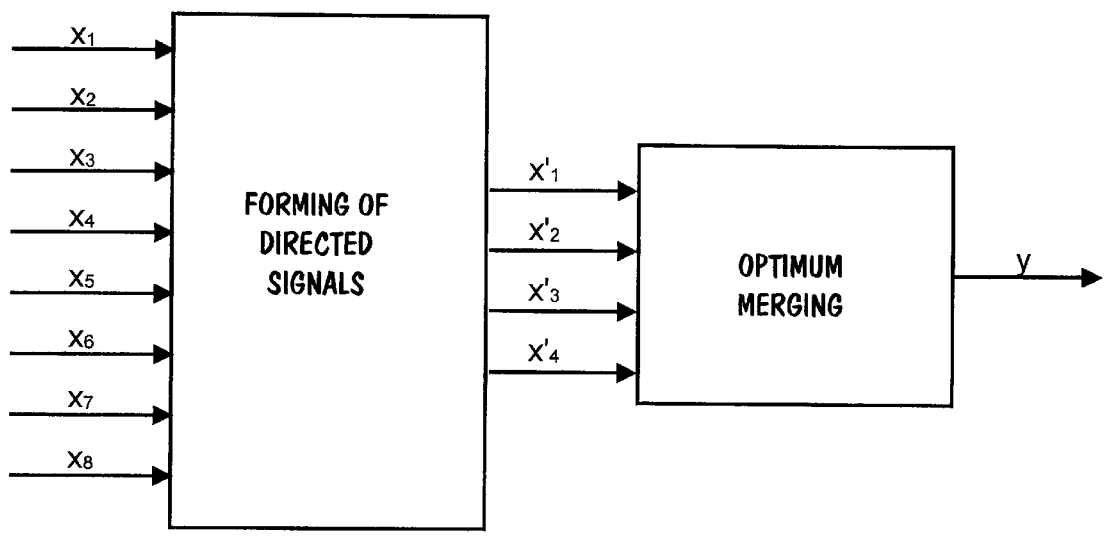
FIG. 8 shows the main principle of the invention.

FIG. 8 shows the inventive principle. Signals $x_1 \ldots x_8$ received from antenna elements are input to a directed signal shaper shaping dynamically directed intermediate signals $x'_1 \ldots x'_4$. The intermediate signals are directed, so they contain less interference and noise than signals obtained from the antenna elements. The directed signals are input to an optimum merger, wherein the transmitted signal is deduced from several intermediate signals. Since the directed signals which are input to the optimum merger contain less interference and noise than the signals obtained from antenna elements, the quality of the interpreted signal obtained from the optimum merger is also improved.

Figure 9:
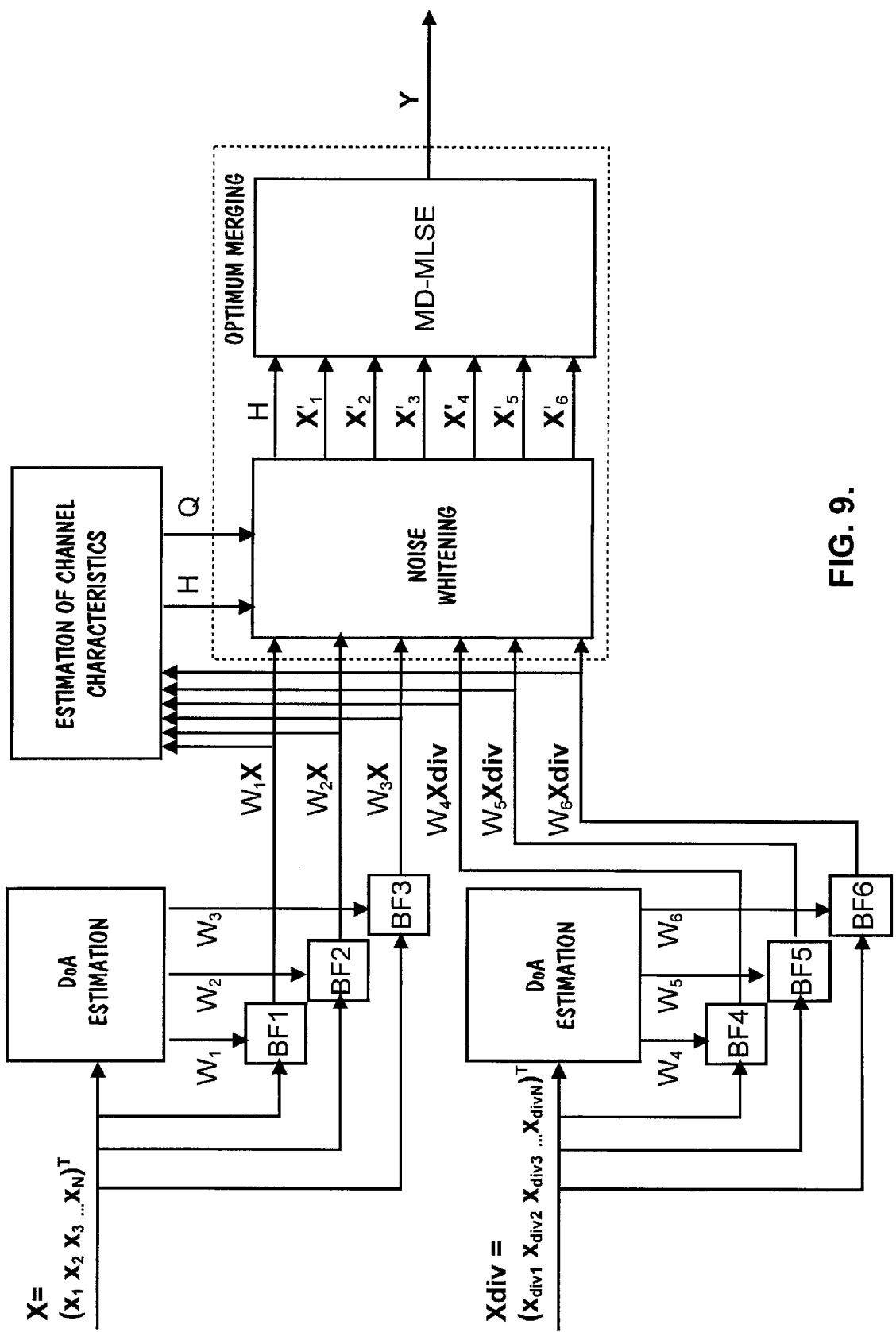
FIG. 9 shows a method of interpretation of a signal from an antenna vector according to a first advantageous embodiment of the invention.

FIG. 9 shows a receiver system in accordance with a first embodiment of the invention. The method is based directly on an analysis of the DoA (Direction of Arrival) of a beam. In the DoA estimation, the direction of arrival of the desired beam is determined from signals obtained from antenna elements and from the signal during the training period of the desired beam. The signal vector X obtained from antenna elements is input to the BF (Beam Former), wherein the vector is multiplied by a complex weight vector phasing the antenna signals, whereby the signal can be directed. Thanks to the directing, the desired signal perceived by the different antenna elements is summed coherently and the noise is summed squarely. E.g. when using eight antenna elements, the signal-to-noise ratio is improved by a factor of 8, that is, by approximately 9 dB. Any signal causing interference to the desired signal will be amplified coherently only if it arrives from the same direction as the desired signal. If an interfering signal arrives from a different direction, it will be attenuated compared with the desired signal, which improves the signal-to-interference ratio of the directed signal.

Besides the most powerful main $W_1X$ containing the desired signal, beams $W_2X$ and $W_3X$ directed in other directions are also formed. These directed beams also amplify a signal arriving from their own direction in relation to noise and to signals arriving from other directions. If the angular divergence of the signal is great, beam formers BF1, BF2 and BF3 may be used for forming a signal directed to the best three beams of the desired signal. If the angular divergence is small, beams $W_2X$ and $W_3X$ which are orthogonal with the main beam are formed in addition to the main beam $W_1X$.

Figure 10:
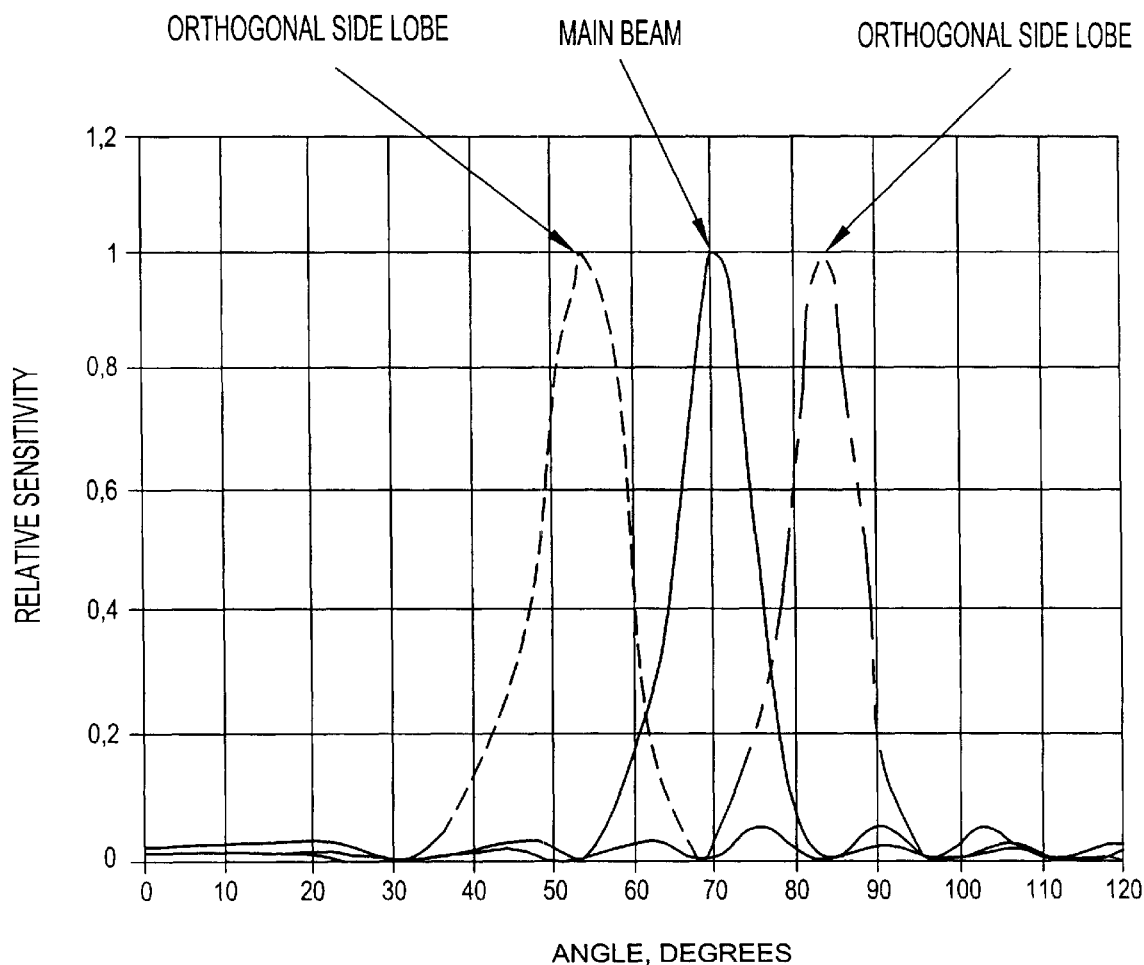
FIG. 10 shows an antenna beam and two beams orthogonal with it.

FIG. 10 shows an example of the amplification of a signal beam and of the signal of its two orthogonal beams as a function of the signal's angle of incidence. In the example shown in the figure, eight antenna elements are used which are located at a distance of half a wave length from each other. According to the definition, the orthogonal beams of the main beam are such beams with which the top level of the signal is achieved at an angle where the signal of the main beam achieves its zero point.

If a diversity antenna is used, that is, (at least) the second set of antenna elements located separately from the first antenna elements, the signals Xdiv (FIG. 9) obtained from its antenna elements are directed entirely in the manner described above. The signals Xdiv of the antenna elements of a diversity antenna may of course be used also together with antenna elements of the first antenna when estimating the signal's direction of arrival and when forming directed antenna signals.

The directed signals $W_iX_j$ are supplied to the channel characteristic estimator, which determines the changes caused by the transmission path to the signal perceived from different directions with the aid of training periods located in the signal to be transmitted. The obtained channel estimates H and any residuals left by the estimation are supplied together with the directed signals to an optimum merger, which in the example shown in the figure is a so-called Ungerboeck algorithm including a noise-bleaching filter and a MultiDimensional Maximum Likelihood Sequence Estimator (MD-MLSE). The signals and estimates are first input to the noise-bleaching filter, which makes the residuals independent of all signal vectors. The idea of this function is to remove any alignment of errors caused to the signals, whereby the interference signal is seen in all signals $X'_i$ obtained from the noise-bleaching filter independently of others. The result is input together with channel estimate H to the MultiDimensional Maximum Likelihood Sequence Estimator (MD-MLSE), wherein channel correction is performed on the signal beams, the transmitted signal is deduced from received signals perceived from different directions and the channel coding is undone. It should be noted, however, that the invention is not limited only to use of this optimum merger structure, but the optimum merger may also be embodied in some other known manner.

The worst possible situation from the viewpoint of interference elimination will result when useful signals and interference signals arrive from exactly the same direction, but from different distances. Even then they will experience different fading in different signal beams and if different training periods are used with them, they can be distinguished from each other. Specific values of this signal vector formed by three signals are the useful signal and interfering signals (and noise signal, if any).

In the presented arrangement, the beam former thus forms three beams, each one of which sees the useful signal: and the interference in a slightly different way. It is not essential for the invention to use exactly three beams targeted in different directions, but the number of beams may be some other number, e.g. five. However, when using a number of directed beams which is considerably less than the number of antenna elements, considerably less complexity of the optimum merger is achieved.

The best amplification of the useful signal is achieved when the antenna can be directed exactly towards the signal's direction of arrival or directions of arrival. Since the beam's direction of arrival changes slowly compared with fading changes, information on the signal's direction of arrival collected over a longer time, e.g. 120 ms, can be used in the estimation of coefficients $W_i$ directing the antenna's sensitivity in the direction of the desired signal. In e.g. a GSM system, this corresponds to 25 bursts.

In the following the operation of the system presented above is studied in a situation where the desired signal arrives at the antenna elements from a direction of 70° and a reflection of the desired beam from a direction of 80°. Interference to the signal is caused by an interference signal arriving from a direction of 63° and by its reflection arriving from a direction of 75°.

For the sake of simplicity such a situation is studied where no diversity antenna is used. Beam formers BF1, BF2 and BF3 are used for forming a main beam directed in a direction of 70° and its orthogonal side lobes directed in directions of 57° and 83°. The signal $W_1X$ of the main beam is $$W_1X = h_{s1}*S + 0.08 \circ h_{s2}*S + 0.3 \circ h_{I1}*I + 0.5 \circ h_{I2}*I + N_1,$$

wherein S is the transmitted desired signal and I is the transmitted interfering signal, $h_{s1}$, $h_{s2}$, $h_{I1}$, and $h_{I2}$ are impulse responses including the delay and attenuation of direct and reflected beams and $N_1$ is noise. The * is a symbol for the convolution operation. The following signals are formed in the orthogonal side lobes $$W_2X = 0.02 \circ h_{s2}*S + 0.18 \circ h_{I1}*I + 0.05 \circ h_{I2}*I + N_2 \text{ and}$$

$$W_3X = 0.6 \circ h_{s2}*S + 0.03 \circ h_{I1}*I + 0.23 \circ h_{I2}*I + N_3.$$

Thus the signals of all beams contain both the desired signal S and an interference signal I, but each beam sees them in different ways. The signals are input to the channel characteristic estimator, wherein such correction operators for each beam are sought for them based on training periods, which will correct non-ideal features of a $h_{s1} + kh_{s2}$ form caused by the channel to the signal. In the estimation the information is also obtained that the signals contain a common interference component. This external correlation between the beams outside the desired signal is removed by the noise-bleaching filter, whereupon the signals of the signal beams are corrected by correction operators obtained from the estimator. In those beams where an interfering signal has experienced a different radio channel than the desired signal, the desired signal is amplified further in this operation compared with the interfering signal. In this way at least some of the signals supplied to the optimum merger are quite clean, which improves considerably the quality of the merger's output signal.

Figure 11:
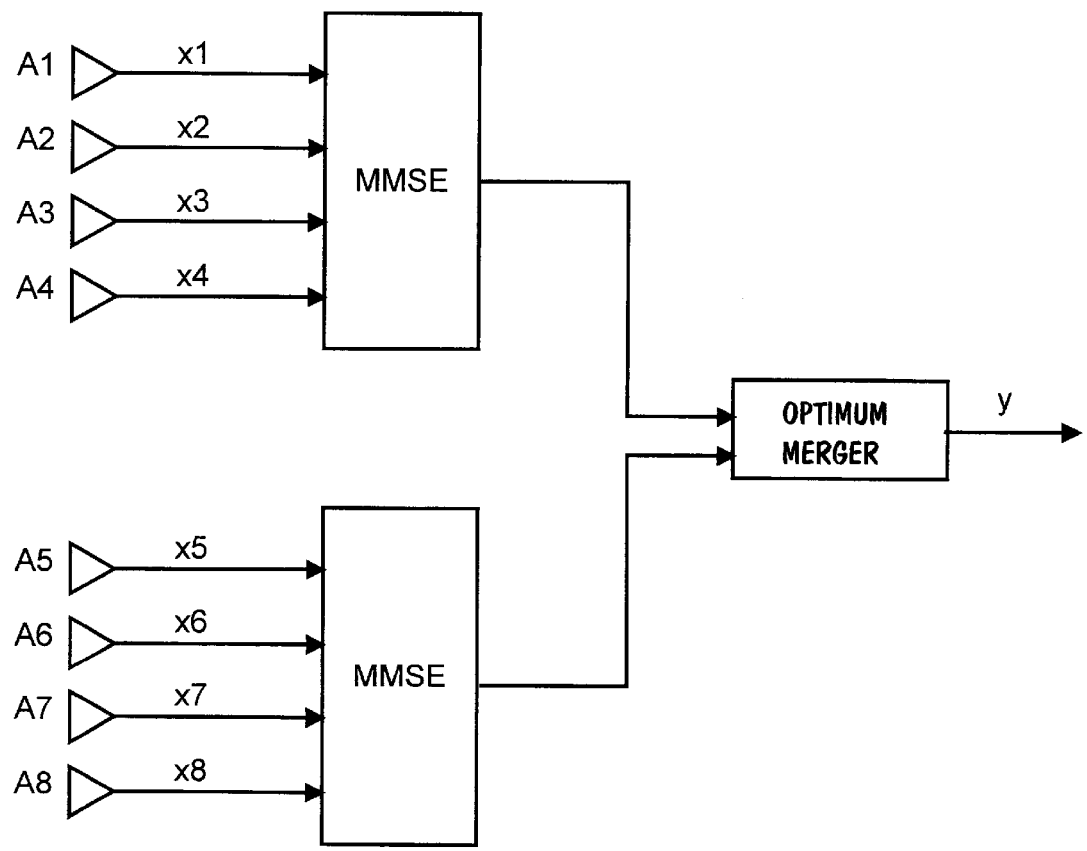
FIG. 11 shows a method of interpretation of a signal from an antenna vector according to another advantageous embodiment of the invention.

FIG. 11 shows an arrangement for interpretation of a signal in accordance with another embodiment of the invention. In the presented arrangement, the number of signal branches obtained from antenna elements is limited by dividing the signals obtained from antenna elements into smaller sets, of which the signals of each set are led to their own time and place dependent channel corrector MMSE shown as a state-of-the-art corrector. In the channel corrector, the channel estimates of channels perceived by the different antennas are calculated based on known modulated training periods, and mutually dependently channel corrected signals of antenna elements are summed together. E.g. in a GSM case, the signals of no more than four antenna elements can be connected to one estimator. In addition to the channel correction, the estimator directs the antenna beam and reduces the number of signal branches to one from the number of its input signals.

Thanks to its time dependence, the MMSE estimator produces a directed channel corrected signal. Any interference signal in signals received by the antenna elements has become weaker compared with the desired signal. However, as the number of antenna elements is limited to four, it is not possible to perform any optimum reduction of the interference with one MMSE estimator.

The directed signals obtained from the time and place dependent channel corrector MMSE all contain a transmitted signal which has experienced the radio channel, interference and noise in a slightly different way. Due to statistic noise, the beams are also directed in slightly different directions. The directed signals are input to the optimum merger. The optimum merger may include e.g. a noise-bleaching filter and a MultiDimensional Maximum Likelihood Sequence Estimator MD-MLSE, which is implemented e.g. by a vectored Viterbi algorithm. The signal sent in the MD-MLSE is deduced from signals obtained from different MMSE estimators and the channel coding is undone. The invention is not limited to use of this optimum merger structure only, but the optimum merger may also be embodied in some other known manner.

Since the number of signals to be input to the optimum merger is considerably less than the number of antenna elements, the optimum merger will be much less complex compared with a system where the signals from antenna elements are connected directly to the optimum merger. In addition, the directed signals supplied to the merger have less noise and interference than the signals of antenna elements, so a very clean and faultless output signal is obtained from the merger output.

What is claimed is:

1. A method of interpretation of a signal received from several separate antenna elements, the method comprising:

receiving signals from a plurality of antenna elements;

forming dynamically directed intermediate signals from the signals received from antenna elements, each of the intermediate signals containing a signal arrived from a substantially narrow angular sector;

supplying the formed intermediate signals to a combiner; and combining by means of said combiner by first filtering the intermediate signals in a noise whitening filter and then interpreting the signal received from several separate antenna elements on the basis of the filtered signals.

2. The method as defined in claim 1, wherein the dynamically directed intermediate signals are formed by multiplying the signals obtained from antenna elements by complex beam forming coefficients directing an antenna array formed of the antenna elements, to detect in certain direction.

3. The method as defined in claim 2, wherein at least a first dynamically directed intermediate signal is formed by multiplying the signals obtained from the antenna elements by complex beam forming coefficients directing the antenna array formed of antenna elements to detect in the direction of a transmitter.

4. The method as defined in claim 3 in a system where the signal to be received comprises bursts, wherein information obtained from a plurality of bursts is used for determination of the complex beam forming coefficients which determine the direction in which the antenna array detects in the transmitter direction.

5. The method as defined in claim 3, wherein at least a second dynamically directed intermediate signal is directed so that it forms an orthogonal beam lobe with the first intermediate signal.

6. The method as defined in claim 1, wherein the number of intermediate signals is less than the number of antenna elements.

7. The method as defined in claim 1, wherein the dynamically directed intermediate signals are formed by combining the signals of at least two antenna elements using a time and place dependent channel corrector.

8. The method as defined in claim 7, wherein the time and place dependent channel corrector is an MMSE estimator minimising a mean error of a sequence.

9. The method as defined in claim 1, wherein the combiner is a MultiDimensional Maximum Likelihood Sequence Estimator MD-MLSE.

10. The method as defined in claim 9, wherein the MultiDimensional Maximum Likelihood Sequence Estimator is provided by a vectored Viterbi algorithm.

11. A radio receiver for interpreting a signal received from several separate antenna elements, the receiver including:

signal directing means for forming several dynamically directed intermediate signals from signals received from antenna elements, which dynamically directed intermediate signals contain a signal arrived at the antenna elements from a substantially narrow angular sector, wherein said dynamically directed intermediate signals are operably connected to a combiner including a noise whitening filter for filtering the directed intermediate signals; and interpretation means for interpreting the signal received from several separate antenna elements on the basis of the filtered signals.

12. The radio receiver as defined in claim 11, wherein the directing means include a beam former.

13. The radio receiver as defined in claim 11, wherein the directing means include an MMSE estimator minimising the mean error of a sequence.

14. The radio receiver as defined in claim 11, wherein the interpretation means include a MultiDimensional Maximum Likelihood Sequence Estimator MD-MLSE.

15. The radio receiver as defined in claim 14, wherein the MultiDimensional Maximum Likelihood Sequence Estimator MD-MLSE is provided by a vectored Viterbi algorithm.

* * * * *